(12) United States Patent
Sobanski et al.

(10) Patent No.: US 11,702,984 B1
(45) Date of Patent: Jul. 18, 2023

(54) OFF-SET DUCT HEAT EXCHANGER

(71) Applicant: Raytheon Technologies Corporation, Farmington, CT (US)

(72) Inventors: Jon E. Sobanski, Glastonbury, CT (US); Malcolm MacDonald, Bloomfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/588,541

(22) Filed: Jan. 31, 2022

(51) Int. Cl.
*F02C 7/12* (2006.01)
*F02C 7/04* (2006.01)

(52) U.S. Cl.
CPC .................. *F02C 7/12* (2013.01); *F02C 7/04* (2013.01); *F05D 2220/323* (2013.01); *F05D 2230/60* (2013.01); *F05D 2260/221* (2013.01)

(58) Field of Classification Search
CPC .... F02C 7/12; F02C 7/04; F02C 7/047; F05D 2220/323; F05D 2230/60; F05D 2261/221
See application file for complete search history.

(56) References Cited

U.S. PATENT DOCUMENTS

| 10,676,205 B2 | 6/2020 | Niergarth et al. |
| 10,800,539 B2 | 10/2020 | Niergarth et al. |
| 11,105,340 B2 | 8/2021 | Cheung et al. |
| 2020/0180771 A1 | 6/2020 | Moore et al. |

FOREIGN PATENT DOCUMENTS

| EP | 1045219 A1 | * | 10/2000 | .......... B01D 53/265 |
| EP | 3248881 A1 | * | 11/2017 | ............. B64D 13/02 |
| GB | 2238080 A | * | 5/1991 | ................ F02C 7/04 |

* cited by examiner

*Primary Examiner* — Steven M Sutherland
(74) *Attorney, Agent, or Firm* — Carlson, Gaskey & Olds, P.C.

(57) ABSTRACT

A heat exchanger system for a propulsion system inlet duct includes a heat exchanger assembly that is disposed within an inlet duct assembly. The heat exchanger includes a heat exchanger with a front facing area that is greater than an area of the inlet duct that is transverse to a longitudinal length of the inlet duct.

20 Claims, 4 Drawing Sheets

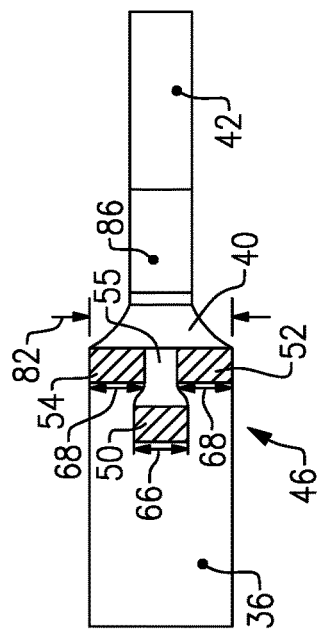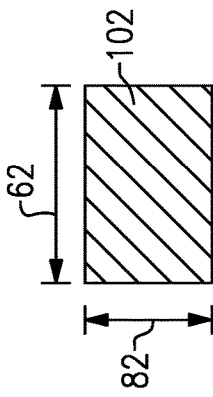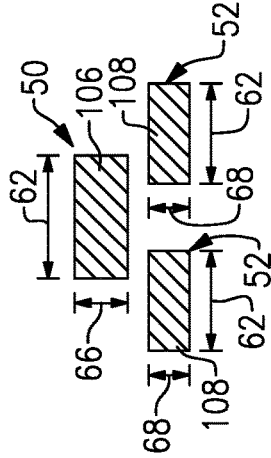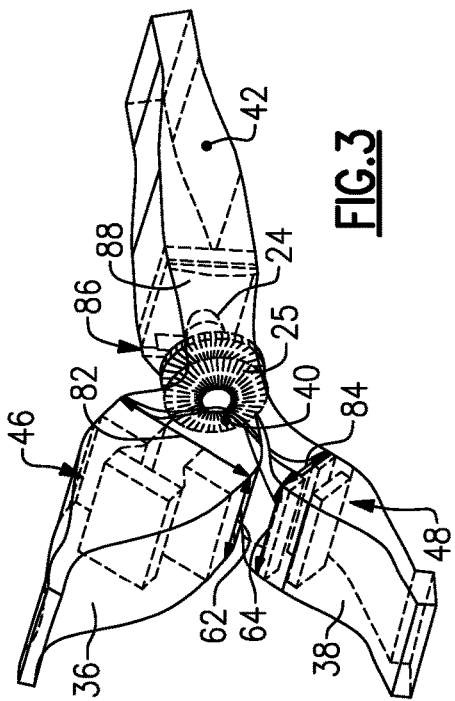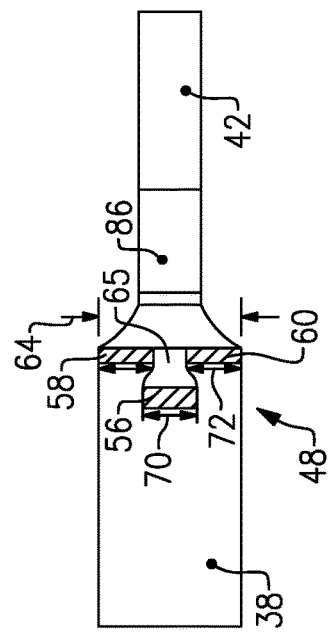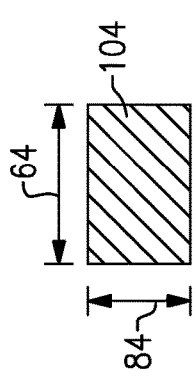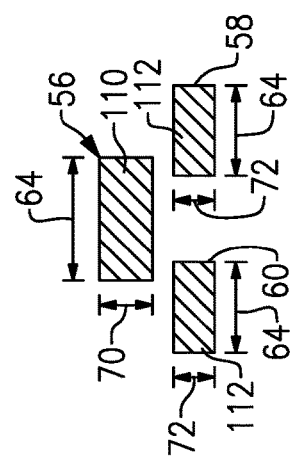

OFF-SET DUCT HEAT EXCHANGER

BACKGROUND

Aircraft propulsion systems use a gas turbine engine that burns carbon based fuels. The aircraft industry desires to significantly reduce carbon emissions produced by aircraft propulsion systems. Engine systems disposed within an aircraft structure provides several benefits to engine operational efficiencies. However, incorporation of propulsion systems within an airframe present challenges to existing engine architectures. Moreover, engine systems within an aircraft structure require ducts to communicate air to a propulsion system and exhaust waste gases and airflow. The size of such ducts are constrained by the aircraft structures and therefore may not provide a desired amount of airflow for cooling.

Although current engine systems have improved propulsive efficiency, aircraft engine manufacturers continue to seek further improvements to engine performance including improvements to thermal, transfer and propulsive efficiencies.

SUMMARY

A heat exchanger system for a propulsion system inlet duct according to an exemplary embodiment of this disclosure, among other possible things includes an inlet duct assembly. The inlet duct assembly includes a cross-sectional area that is defined in a plane taken transverse to a longitudinal length of the inlet duct. A heat exchanger assembly is disposed in the inlet duct assembly. The heat exchanger assembly has a front facing cross-sectional area that is greater than the cross-sectional area of the inlet duct.

In a further embodiment of the foregoing, the heat exchanger assembly includes a forward portion that is spaced axially forward of a first aft portion and a second aft portion.

In a further embodiment of any of the foregoing, the front facing cross-sectional area of the heat exchanger includes combined front facing cross-sectional areas of the forward portion, the first aft portion and the second aft portion.

In a further embodiment of any of the foregoing, the front facing portion is centered in the inlet duct in a direction transverse to the longitudinal length. The first aft portion is disposed along a first side of the inlet duct and the second portion is disposed along a second side inlet duct.

In a further embodiment of any of the foregoing, each of the forward portion, the first aft portion and the second aft portion are the same size.

In a further embodiment of any of the foregoing, the front facing cross-sectional area of the heat exchanger is between 10 and 40 percent larger than the cross-sectional area of the inlet duct.

In a further embodiment of any of the foregoing, the inlet duct assembly includes an upper inlet duct and a lower inlet duct and the heat exchanger assembly includes an upper heat exchanger assembly in the upper inlet duct and a lower heat exchanger assembly in the lower inlet duct and a combined front facing cross-sectional area of the upper heat exchanger assembly and the lower heat exchanger assembly is greater than a combined front facing cross-sectional area of the upper inlet duct and the lower inlet duct.

In a further embodiment of any of the foregoing, the upper inlet duct and the lower inlet duct are differently sized.

In a further embodiment of any of the foregoing, the upper inlet duct is larger than the lower inlet duct.

In a further embodiment of any of the foregoing, the upper inlet duct and the lower inlet duct are configured to be in communication with a boundary layer flow of air along outer surfaces of an aircraft structure.

An aircraft propulsion system according to an exemplary embodiment of this disclosure, among other possible things includes a propulsor assembly that is disposed in an aircraft structure. The propulsor assembly includes a propulsive fan rotatable about a fan axis. A first inlet duct is disposed in the aircraft fuselage forward of the propulsive fan. The first inlet duct has a cross-sectional area in a plane that is defined transverse to a longitudinal length of the first inlet duct. A first heat exchanger assembly is disposed in the first inlet duct. The first heat exchanger assembly includes a front facing cross-sectional area that is greater than the cross-sectional area of the first inlet duct.

In a further embodiment of the foregoing, the first heat exchanger assembly includes a forward portion that is spaced axially forward of a first aft portion and a second aft portion.

In a further embodiment of any of the foregoing, the front facing cross-sectional area of the first heat exchanger assembly includes a combined front facing cross-sectional area of the forward portion, the first aft portion and the second aft portion.

In a further embodiment of any of the foregoing, the front facing portion is centered in the first inlet duct. The first aft portion is disposed along a first side of the first inlet duct and the second aft portion is disposed along a second side of the first inlet duct.

In a further embodiment of any of the foregoing, the front facing cross-sectional area of the first heat exchanger assembly is between 10 and 40 percent larger than the cross-sectional area of the first inlet duct.

In a further embodiment of any of the foregoing, the aircraft propulsion system further includes a second heat exchanger assembly in a second inlet duct. The second inlet duct has a cross-sectional area that is defined in a plane transverse to a longitudinal length of the second inlet duct and the second heat exchanger assembly has a front facing cross-sectional area that is greater than the cross-sectional area of the second inlet duct.

In a further embodiment of any of the foregoing, the second heat exchanger assembly includes a forward portion that is spaced axially forward of a first aft portion and second aft portion in the second inlet duct.

In a further embodiment of any of the foregoing, the front facing cross-sectional area of the second heat exchanger assembly is between 10 and 40 percent larger than the cross-sectional area of the second inlet duct.

In a further embodiment of any of the foregoing, a combined front facing cross-sectional area of the first heat exchanger assembly and the second heat exchanger assembly is between 10 and 40 percent larger than a combined cross-sectional area of the first inlet duct and the second inlet duct.

A method of assembling an inlet duct for an aircraft propulsion system disposed in an aircraft structure, the method according to an exemplary embodiment of this disclosure, among other possible things includes assembling a first inlet duct for communicating airflow to a propulsive fan. The first inlet duct is assembled to include a cross-sectional area in a plane that is defined transverse to a longitudinal length of the first inlet duct. A first heat exchanger assembly is mounted into the first inlet duct forward of the propulsive fan. The first heat exchanger assembly is mounted to include a front facing cross-sectional area that is greater than the cross-sectional area of the first inlet duct.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a perspective view of an example aircraft propulsion system.

FIG. 4 is a schematic top view of the example aircraft propulsion system.

FIG. 5 is a schematic view of a maximum area of a disclosed upper inlet duct.

FIG. 6 is a schematic view of a front facing areas of a disclosed upper heat exchanger assembly.

FIG. 7 is a schematic bottom view of the example aircraft propulsion system.

FIG. 8 is a schematic view of a maximum area of a disclosed lower inlet duct.

FIG. 9 is a schematic view of a front facing areas of a disclosed lower heat exchanger assembly.

DETAILED DESCRIPTION

Figure 1:
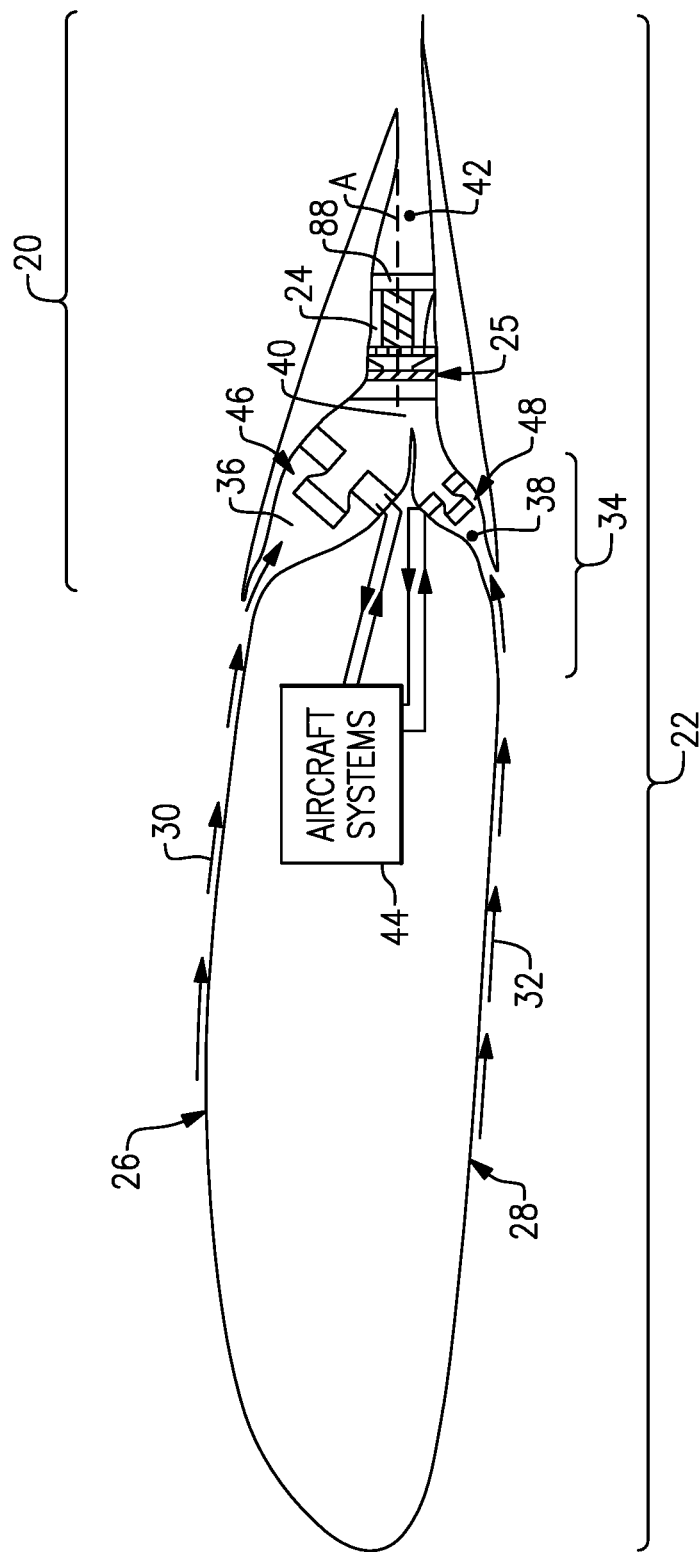
FIG. 1 is a schematic view of an example aircraft propulsion system.

FIG. 1 is a schematic view of an example aircraft propulsion system 20 disposed within an aircraft structure 22. The aircraft structure 22 may be the aircraft fuselage and/or a portion of a wing or other lift generating aircraft structure. A propulsor assembly 24 is disposed within the aircraft structure 22 and draws an upper boundary layer flow 30 along an upper surface 26 and a lower boundary layer flow 32 from along a lower surface 28 into an inlet duct assembly 34. The propulsor assembly 24 generates thrust and exhausts the ingested flows 30, 32 through an exhaust duct 42.

The inlet duct assembly 34 includes an upper inlet duct 36 and a lower inlet duct 40 that merge into a common inlet duct 40 forward of the propulsor assembly 24. The air flows from the upper inlet duct 36 and the lower inlet duct 40 are merged within the common inlet duct 40 and communicated to the propulsor assembly 24. The propulsor assembly 24 imparts energy to the inlet flows to generate a propulsive flow that is exhausted through the exhaust duct 42.

The ducting of airflow into the propulsor assembly 24 is of a limited size due to being disposed within the aircraft structure 22 rather than disposed within a nacelle. The limited size of the inlet duct 34 constrains the amount of airflow available for cooling engine aircraft systems 44. A disclosed propulsion system embodiment 20 includes heat exchanger assemblies 46, 48 with an increased thermal transfer area without increasing duct size. The disclosed heat exchanger assemblies 46, 48 further provide desired airflow communicated to the propulsor assembly 24.

The example inlet duct assembly 34 includes an upper inlet duct 36 that draws boundary layer airflow 30 from the top surface 26 and a lower inlet duct 38 that draws boundary layer airflow 32 from the bottom surface 28. Each of the upper inlet duct 36 and the lower inlet duct 38 feed a common duct 40 just forward of the propulsor assembly 24. The propulsor assembly 24 includes a fan 25 that generates propulsive thrust. The inlet duct assembly 34 provides for converging and diverging airflow to facilitate low airflow velocity and low pressure drops that provide improved propulsive efficiencies.

Each of the upper inlet duct 36 and the lower inlet duct 38 provide a diverging configuration that provides desired airflow pressures and velocities. The limited size of the ducting can reduce the area available to provide for thermal transfer. The disclosed example heat exchanger assemblies 46, 48 disposed in respective inlet ducts 36, 38 include features to increase thermal transfer capabilities within the constraints of the existing airflow.

Figure 2:
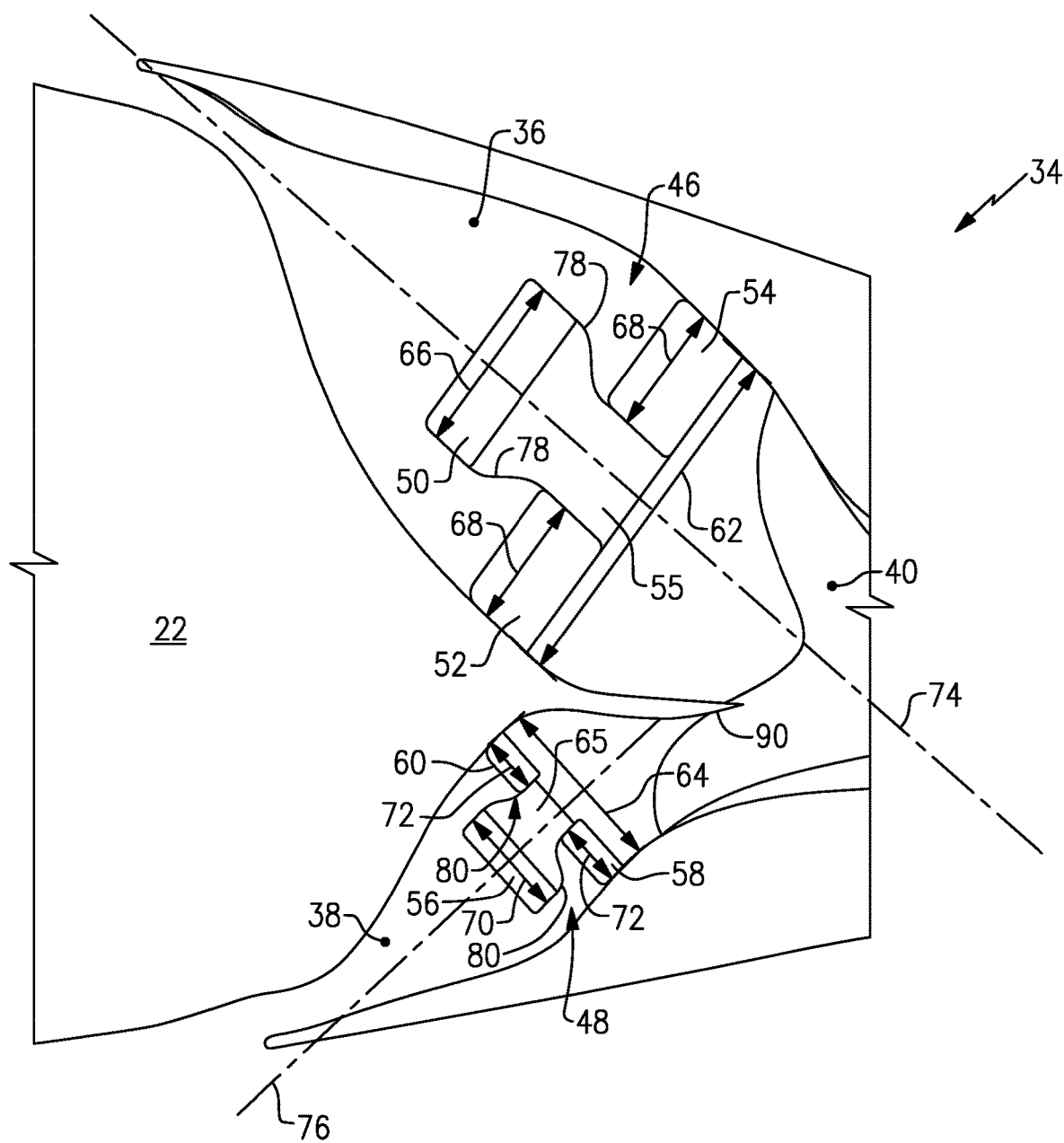
FIG. 2 is a schematic view of an example inlet duct and heat exchanger assembly.

Referring to FIGS. 2 and 3 with continued reference to FIG. 1, the inlet duct assembly 34 is shown with the upper inlet duct 36 and the lower inlet duct 38 separated by a splitter 90 and merging into the common duct 40. The common duct 40 communicates air to the propulsor assembly 24 that is disposed within a propulsor space 86. Airflow is then exhausted through an aft heat exchanger 88 disposed in the aft duct 42. In the disclosed duct assembly embodiment, the upper inlet duct 36 is larger than the lower inlet duct 38. The disclosed upper inlet duct 36 and lower inlet duct 38 are rectangularly shaped with each having a height and width that define a cross-sectional flow area transverse to an axis extending through each duct 36, 38.

The upper duct 36 is disposed along an upper longitudinal axis 74 that is angled relative to an engine axis A (FIG. 1). The lower duct 38 is disposed along a lower longitudinal axis 76 that is also angled relative to the engine axis A.

The upper inlet duct 36 has a maximum height 82 (FIG. 3) and a width 62 (FIG. 2). The width 62 is uniform for the entire duct 36. The height diverges from the inlet toward the maximum height 82 that is disposed just prior to merging with the common duct 40. The maximum cross-sectional area of the upper inlet duct 36, in this example embodiment, is disposed at the location of the maximum height 82.

The lower inlet duct 38 includes a height 84 (FIG. 3) and a maximum width 64 (FIG. 2) that is disposed just forward of the merge into the common duct 40. The width 64 is constant and uniform along the lower duct 38 and the height diverges from the inlet toward the maximum height 84.

The maximum heights 82, 84 of the upper duct 36 and the lower duct 38 provide the maximum flow area. The heat exchanger assemblies 46 and 48 are disposed at or substantially adjacent the maximum height locations of each duct.

It should be understood, that the disclosed example ducts 36 and 38 diverge and converge along the height and are uniform along the width. However, it is within the contemplation and scope of this disclosure that the width of each of the ducts 36, 38 may diverge and converge with the height remaining constant. Moreover, both the height and width of each of the ducts 36, 38 may diverge and converge and such a configuration is within the contemplation and scope of this disclosure. Furthermore, with any diverging converging duct configuration, the disclosed example heat exchanger assemblies 82, 84 provide a corresponding shape and may be offset both in height and width. Accordingly, the disclosed heat exchanger assembly 82, 84 provides an increase in thermal transfer area relative to a maximum duct area for increased thermal transfer efficiencies.

Referring to FIGS. 4, 5 and 6 with continued reference to FIGS. 2 and 3, the upper heat exchanger assembly 46 includes a forward portion 50 that is spaced apart axially forward of a first aft portion 52 and a second aft portion 54. The aft portions 52, 54 are disposed against side walls of the upper inlet duct 36 such that an open space 55 is disposed therebetween. An inner duct wall 78 is provided between the forward portion 50 and each of the aft portions 52, 54. The inner duct wall 78 prevents airflow within the axial space between the forward portion 50 and the aft portions 52, 54 to assure that air flows through the heat exchanger assembly 46.

The forward portion 50 is larger than the width of the open space between the aft portions 52, 54 such that the forward portion 50 overlaps the aft portions 52, 54. The overlapping configuration is provided by a width 66 of the forward portion 50. The width 66 is greater than that of the space between the aft portions 52, 54. Each of the aft portions 52, 54 have a width 68. In this disclosed embodiment, the width 68 of each of the aft portions 52, 54 are the same.

A maximum cross-sectional area 102 of the upper duct 36 is shown in FIG. 5 and is based on the width of the upper duct 62 and the maximum height 82. The maximum cross-sectional area 102 is defined within a plan transverse to the longitudinal axis 74 at the location of the maximum height 82. The upper heat exchanger includes a total cross-sectional area that is a combination of area 106 of the forward portion 50 and cross-sectional areas 108 of each aft portion 52, 54. Note that the forward portion 50 and the aft portions 52, 54 are shown skewed apart for illustration purposes. The combination of the cross-sectional areas 106 and 108 is larger than the cross-sectional area 102 within the upper duct 36.

In one disclosed embodiment, the combined forward facing cross-sectional areas 106, 108 of the upper heat exchanger assembly 46 is between 10% and 40% larger than the cross-sectional area 102.

In another disclosed example embodiment, the combined forward facing cross-sectional areas 106, 108 of the upper heat exchanger assembly 46 is between 20% and 25% larger than the cross-sectional area 102.

In another disclosed example embodiment, the combined forward facing cross-sectional areas 106, 108 of the upper heat exchanger assembly 46 is between 30% and 35% larger than the cross-sectional area 102.

In another disclosed example embodiment, the combined forward facing cross-sectional areas of the upper heat exchanger assembly 46 is between 15% and 25% larger than the cross-sectional area 102.

In another disclosed example embodiment, the combined forward facing cross-sectional area of the upper heat exchanger assembly 46 is between 20% and 35% larger than the cross-sectional area 102.

In another disclosed example embodiment, the combined forward facing cross-sectional area of the upper heat exchanger assembly 46 is around 20% larger than the cross-sectional area 102.

In another example embodiment, the combined forward facing cross-sectional area of the upper heat exchanger assembly 46 is around 30% larger than the cross-sectional area 102 of the upper duct 36 at the location corresponding with the maximum height 82.

The larger forward facing area provided by the heat exchanger assembly 46 provides increased thermal transfer capacity without increasing duct size.

Referring to FIGS. 7, 8 and 9 with continued reference to FIGS. 2 and 3, the lower inlet duct 38 includes the lower heat exchanger assembly 48. The lower heat exchanger assembly 48 is scaled to fit into the smaller lower inlet duct 38 but maintains the proportionally larger front facing cross-sectional area as compared to the maximum front facing cross-sectional area located at the maximum height 84. The lower inlet duct 38 includes a width 64 that is uniform along the entire duct. A height of the lower inlet duct 38 increases in a direction away from an inlet opening to the maximum height 84. The maximum height 84 in this example is disposed at the axial location where the common inlet duct 40 begins.

A maximum cross-sectional area 104 (FIG. 8) of the lower inlet duct 38 is smaller than a combined forward facing area of the lower heat exchanger 48. The term forward facing refers to a plane defined transverse to the longitudinal axis 76 extending through the lower inlet duct 38. The lower heat exchanger assembly 48 is configured in a similar manner to the upper heat exchanger assembly 46. A forward portion 56 is spaced forward of a first aft portion 58 and a second aft portion 60. A spacing 65 is disposed between the aft portions 58, 60. A duct 80 is provided in the axial space between the forward portion 56 and each of the aft portions 58, 60. The forward portion 56 includes a height 70 that is greater than the spacing 65 such that the forward portion 56 overlaps the aft portions 58, 60 when viewed along the axis 76.

The combined forward portion front facing cross-sectional area 110 and front facing cross-sectional area 112 of each of the aft portions 58, 60 is larger than the cross-sectional area 104 (FIG. 8) of the lower inlet duct 38. The front facing cross-sectional area 112 is based on a height of 72 and a width 64 of each of the aft portions 58, 60. The front facing area 110 is based on the height 70 and width 64 of the forward portion 56. In one disclosed embodiment, the front facing cross-sectional area provided by the lower heat exchanger assembly 48 is between 15% and 23% larger than the cross-sectional area 104. In another disclosed example embodiment, the combined forward facing cross-sectional area of the lower heat exchanger assembly 48 is between 15% and 18% larger than the cross-sectional area 104 of the lower duct 38. In another disclosed embodiment, the heat exchange cross-sectional area is around 15% larger than the area 104 of the lower duct 38 at the location corresponding with the maximum height 84.

It should be appreciated, that the combined cross-sectional area of both the upper and lower heat exchanger assemblies 46, 48 provide a larger cross-sectional area than the combined duct cross-sectional areas by the same percentages as for each individual heat exchanger assembly 46, 48. The increased front facing cross-sectional areas provide desired thermal transfer efficiencies while maintaining duct sizing that provide desired aerodynamic properties that improve propulsive efficiencies.

Figure 10:
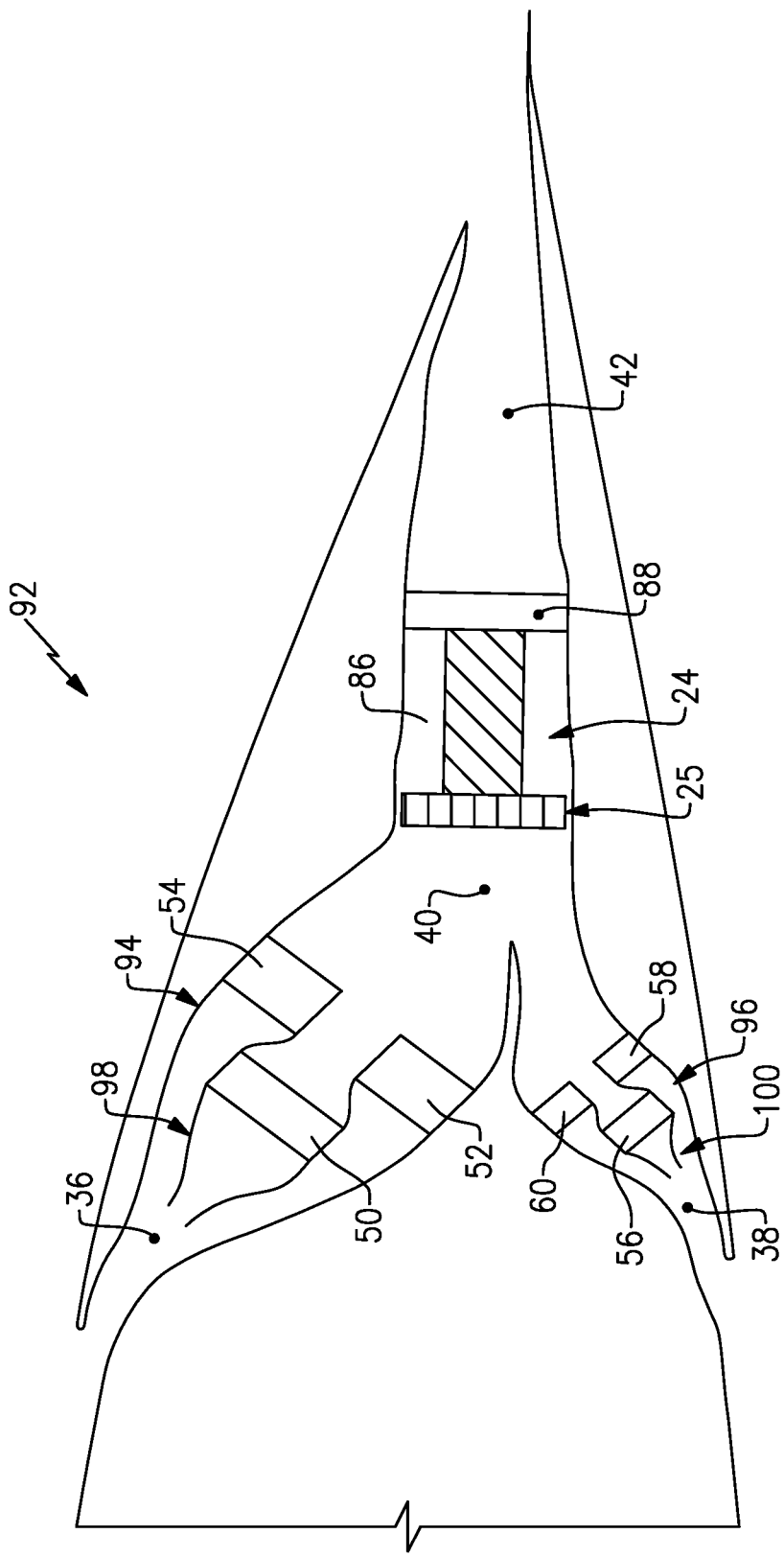
FIG. 10 is a schematic view of another example aircraft propulsion system.

Referring to FIG. 10, another propulsion system embodiment is schematically shown and indicated at 92. The example propulsion system 92 includes an upper heat exchanger assembly 94 disposed in the upper inlet duct 36. A lower heat exchanger assembly 96 is disposed in the lower inlet duct 38. The upper and lower heat exchanger assemblies 94, 96 are configured in a similar offset manner to the heat exchanger assemblies 46, 48. The upper and lower heat exchanger assemblies 94, 96 include an additional duct feature to provide desired airflow properties to the forward heat exchanger portions 50, 56.

The upper heat exchanger assembly 94 includes the duct 98 that directs airflow to the forward portion 50. The example duct 98 is converging diverging duct that increases in cross-sectional area in a direction toward the forward face of the forward portion 50. The The lower heat exchanger assembly 96 includes duct 100 that directs airflow to the forward portion 56. The duct 100 is also a converging diverging duct with a cross-sectional area that increases in a direction toward the forward face of the forward portion 56.

The converging/diverging ducts 98, 100 provide for modification of airflows that can improve thermal transfer without significantly changing airflows to the propulsor assembly 24. Moreover, the different duct geometries for the propulsor assembly 24 and the heat exchanger assemblies provide for individual tailoring of airflows to improve overall efficiencies.

Accordingly, the disclosed example heat exchanger assembles provide for increased thermal efficiencies with the constraints of inlet ducts of limited size. Moreover, the disclosed heat exchanger assemblies provide for increased overall engine efficiency by providing for ingestion of boundary layer flow and also provides a tailorable propulsor configuration that is adaptable to different aircraft structures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A heat exchanger system for a propulsion system inlet duct comprising:
   an inlet duct assembly, wherein the inlet duct assembly includes a maximum cross-sectional area defined in a plane taken transverse to a longitudinal length of the inlet duct; and
   a heat exchanger assembly disposed in the inlet duct assembly, the heat exchanger assembly having a front facing cross-sectional area that is transverse to the longitudinal length of the inlet duct and that is greater than the maximum cross-sectional area of the inlet duct.

2. The heat exchanger system as recited in claim 1, wherein the heat exchanger assembly includes a forward portion that is spaced axially forward of a first aft portion and a second aft portion.

3. The heat exchanger system as recited in claim 2, wherein the front facing cross-sectional area of the heat exchanger comprises combined front facing cross-sectional areas of the forward portion, the first aft portion and the second aft portion.

4. The heat exchanger system as recited in claim 3, wherein the front facing portion is centered in the inlet duct in a direction transverse to the longitudinal length, the first aft portion is disposed along a first side of the inlet duct and the second portion is disposed along a second side of the inlet duct.

5. The heat exchanger system as recited in claim 3, wherein each of the forward portion, the first aft portion and the second aft portion have the same size cross-sectional area.

6. The heat exchanger system as recited in claim 1, wherein the front facing cross-sectional area of the heat exchanger is between 10 and 40 percent larger than the maximum cross-sectional area of the inlet duct.

7. A heat exchanger system for a propulsion system comprising:
   an inlet duct assembly, wherein the inlet duct assembly includes a cross-sectional area defined in a plane taken transverse to a longitudinal length of the inlet duct; and
   a heat exchanger assembly disposed in the inlet duct assembly, the heat exchanger assembly having a front facing cross-sectional area that is greater than the cross-sectional area of the inlet duct, wherein the inlet duct assembly includes an upper inlet duct and a lower inlet duct and the heat exchanger assembly includes an upper heat exchanger assembly in the upper inlet duct and a lower heat exchanger assembly in the lower inlet duct and a combined front facing cross-sectional area of the upper heat exchanger assembly and the lower heat exchanger assembly is greater than a combined front facing cross-sectional area of the upper inlet duct and the lower inlet duct.

8. The heat exchanger system as recited in claim 7, wherein the upper inlet duct and the lower inlet duct are differently sized.

9. The heat exchanger system as recited in claim 8, wherein the upper inlet duct is larger than the lower inlet duct.

10. The heat exchanger system as recited in claim 7, wherein the upper inlet duct and the lower inlet duct are configured to be in communication with a boundary layer flow of air along outer surfaces of an aircraft structure.

11. An aircraft propulsion system comprising:
    a propulsor assembly disposed in an aircraft structure, the propulsor assembly including a propulsive fan rotatable about a fan axis;
    a first inlet duct disposed in the aircraft structure forward of the propulsive fan, the first inlet duct having a cross-sectional area in a plane defined transverse to a longitudinal length of the first inlet duct; and
    a first heat exchanger assembly disposed in the first inlet duct, the first heat exchanger assembly including a front facing cross-sectional area that is greater than the cross-sectional area of the first inlet duct, wherein the first inlet duct includes a maximum cross-sectional area that is transverse to the longitudinal length of the first the inlet duct and the front facing cross-sectional area of the first heat exchanger is transverse to the longitudinal length of the first inlet duct and is greater than the maximum cross-sectional area of the first inlet duct.

12. The aircraft propulsion system as recited in claim 11, wherein the first heat exchanger assembly includes a forward portion that is spaced axially forward of a first aft portion and a second aft portion.

13. The aircraft propulsion system as recited in claim 12, wherein the front facing cross-sectional area of the first heat exchanger assembly comprises a combined front facing cross-sectional area of the forward portion, the first aft portion and the second aft portion.

14. The aircraft propulsion system as recited in claim 13, wherein the front facing portion is centered in the first inlet duct, the first aft portion is disposed along a first side of the first inlet duct and the second aft portion is disposed along a second side of the first inlet duct.

15. The aircraft propulsion system as recited in claim 11, wherein the front facing cross-sectional area of the first heat exchanger assembly is between 10 and 40 percent larger than the cross-sectional area of the first inlet duct.

16. The aircraft propulsion system as recited in claim 11, further including a second heat exchanger assembly in a second inlet duct, the second inlet duct having a cross-sectional area defined in a plane transverse to a longitudinal length of the second inlet duct and the second heat exchanger assembly having a front facing cross-sectional area that is greater than the cross-sectional area of the second inlet duct.

17. The aircraft propulsion system as recited in claim 16, wherein the second heat exchanger assembly includes a forward portion, spaced axially forward of a first aft portion and second aft portion in the second inlet duct.

18. The aircraft propulsion system as recited in claim 16, wherein the front facing cross-sectional area of the second heat exchanger assembly is between 10 and 40 percent larger than the cross-sectional area of the second inlet duct.

19. The aircraft propulsion system as recited in claim 16, wherein a combined front facing cross-sectional area of the first heat exchanger assembly and the second heat exchanger assembly is between 10 and 40 percent larger than a combined cross-sectional area of the first inlet duct and the second inlet duct.

20. A method of assembling an inlet duct for an aircraft propulsion system disposed in an aircraft structure, the method comprising:
   assembling a first inlet duct for communicating airflow to a propulsive fan, the first inlet duct assembled to include a maximum cross-sectional area in a plane defined transverse to a longitudinal length of the first inlet duct; and
   mounting a first heat exchanger assembly into the first inlet duct forward of the propulsive fan, the first heat exchanger assembly mounted to include a front facing cross-sectional area that is transverse to the longitudinal length and that is greater than the maximum cross-sectional area of the first inlet duct.

* * * * *